June 20, 1950  O. L. FLUHARTY  2,512,203
RACK STRUCTURE
Filed Jan. 17, 1947
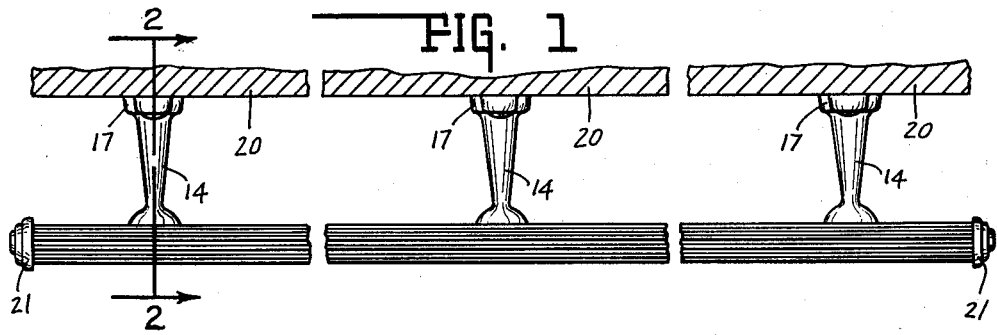
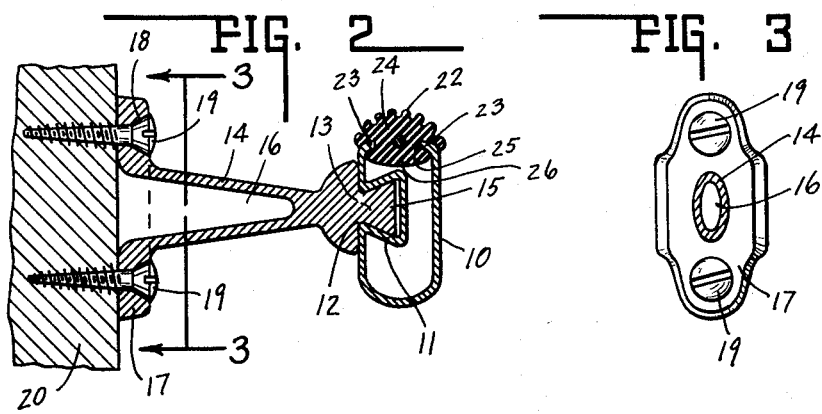
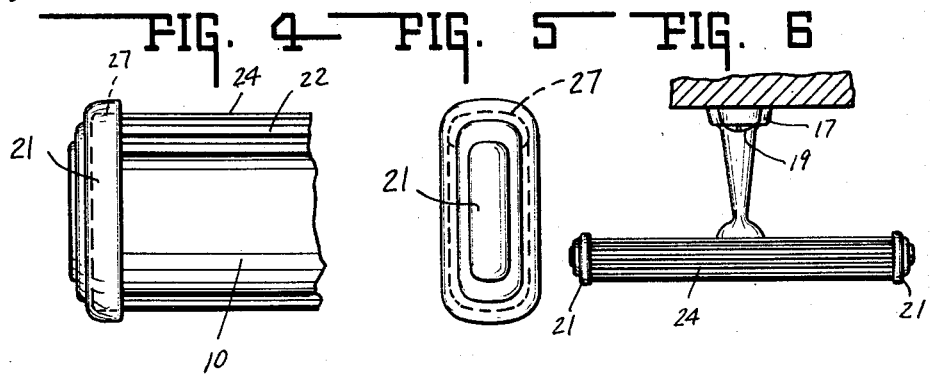
INVENTOR.
OMAR L. FLUHARTY.
BY
Lockwood, Goldsmith & Jr.
ATTOR Patented June 20, 1950

2,512,203

UNITED STATES PATENT OFFICE 2,512,203

RACK STRUCTURE

Omar L. Fluharty, Indianapolis, Ind.

Application January 17, 1947, Serial No. 722,725

1 Claim. (Cl. 211—123)

This invention relates to a bar and its supports adapted for application to a supporting surface such as wall for the support of towels, wash rags, etc.

The chief object of the present invention is to provide such a supporting bar and at least a pair of spaced supports for the same, said supports having any desired spacing therebetween as desired or required, the bar having any desired or required length.

Another object of the present invention is to provide the bar with anti-slip means or an anti-slip surface.

The chief feature of the present invention resides in the complementary formations on the confronting portions of all supports and the bar whereby same may be adjusted relatively to each other for support spacing as desired and required and which portions are of interfitting gripping character.

Another feature of the present invention resides in the addition to the bar of an anti-slip device and which herein has the additional function of assisting in effecting the aforesaid gripping action.

A further feature of the invention resides in the utilization of one or more of said supports with a single bar, the latter having any desired length, the latter determining the number of such supports to be utilized with the single bar.

Other objects and features of the invention will be set forth more fully hereinafter.

The full nature of the invention will be understood from the accompanying drawings and the following description and claim.

In the drawings:

Fig. 1 is a top plan view showing a long bar with at least three supports, and the supporting surface, herein a wall.

Fig. 2 is an enlarged sectional view taken on line 2—2 of Fig. 1 and in the direction of the arrows.

Fig. 3 is a sectional view taken on line 3—3 of Fig. 2 and in the direction of the arrows.

Fig. 4 is an enlarged front elevation of a capped bar end.

Fig. 5 is an end elevation of the bar cap.

Fig. 6 is a plan view of a single support embodiment of the invention.

As stated initially herein, the present invention is directed to a bar of any desired length and provided with any desired number of supports depending upon the length of the bar and the articles to be supported thereby or such other uses to which the bar may be subjected.

Herein 10 indicates a tubular-like bar of semi-rigid character such as steel, aluminum or the like. Coextensive therewith is a reentrant, keystone or dove-tail sectioned groove 11 upon its rear face, the throat 12 of which is slightly less in width than the thickness of neck 13 of a support 14 having a complementary head portion 15.

The support 14 may be tubular, as indicated at 16, and include an elongated base 17 apertured and countersunk at 18 to accommodate screws 19 or the like for connection to a supporting surface such as a wall 20.

One or more of the brackets or supports are secured in position upon wall 20. Then bar 10 is applied longitudinally to the heads 15, the groove yielding as it were. When the bar is properly positioned the tube grips the support or supports and is firmly supported thereby.

The bar, being tubular, has its open ends preferably capped as at 21. Herein when the bar is utilized for towel rack service the upper edge 22 thereof is serrated, grooved or roughened to prevent towel falling, etc. Herein tube 10 is split and includes two inwardly directed and spaced flanges 23. An insert such as a semi-resilient member 24 includes the roughened face 22, the oppositely disposed grooves 25 and the head or anchor portion 26.

Preferably but not necessarily this insert is coextensive with the bar and the cap 21 at 27 is recessed to accommodate the projecting portion of the insert. The insert, in addition to preventing towel slippage, also serves as a wedge to constrict throat 12 to insure constant gripping of the bracket head. If desired said head may be elongated in the direction parallel to the bar. The insert may be of colored rubber or rubber-like material.

If the bar is aluminum the bracket preferably would be cast aluminum, if of steel and plated, the bracket would be cast and similarly or contrastingly covered or surfaced.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claim.

The invention claimed is:

In a bar and bracket structure having an elongated bar member and a support bracket member disposed substantially transverse thereto, the combination therewith of a locking connection therebetween and longitudinally adjustable relative to the bar length and comprising an inwardly directed wedge sectioned socket in the confronting face of one of said members and inherently constrictive in character, and a wedge portion on the confronting face of the other member and clampingly engaged by the opposed walls of the socket when the wedge portion is seated therein, said bar comprising a tube split to provide a throat to receive a non-slip insert, said tube having a reentrant formation in spaced relation to the throat and comprising the said socket, and a non-slip insert seated in the throat and coextensive therewith for closing same and yieldingly constricting the socket walls.

OMAR L. FLUHARTY.

REFERENCES CITED

The following references are of record in the file of this patent:

UNITED STATES PATENTS

| Number | Name | Date |
|---|---|---|
| 257,942 | Hickman | May 16, 1882 |
| 752,203 | Cook | Feb. 16, 1904 |
| 1,883,974 | Kusterle | Oct. 25, 1932 |
| 2,052,606 | Comstock | Sept. 1, 1936 |
| 2,060,760 | Keil | Nov. 10, 1936 |
| 2,165,814 | Redmond | July 11, 1939 |

FOREIGN PATENTS

| Number | Country | Date |
|---|---|---|
| 409,444 | Great Britain | May 3, 1934 |
| 822,313 | France | Sept. 13, 1937 |